(12) United States Patent
Neal

(10) Patent No.: US 9,704,417 B2
(45) Date of Patent: Jul. 11, 2017

(54) BREADBOARD

(71) Applicant: Michael T. Neal, Dayton, OH (US)

(72) Inventor: Michael T. Neal, Dayton, OH (US)

( * ) Notice: Subject to any disclaimer, the term of this patent is extended or adjusted under 35 U.S.C. 154(b) by 222 days.

(21) Appl. No.: 14/827,220

(22) Filed: Aug. 14, 2015

(65) Prior Publication Data

US 2017/0046983 A1 Feb. 16, 2017

(51) Int. Cl.
*G09B 23/18* (2006.01)

(52) U.S. Cl.
CPC .................................. *G09B 23/183* (2013.01)

(58) Field of Classification Search
CPC ... G09B 23/183; G09B 23/185; G09B 23/186
USPC ...... 434/224, 379, 393; 439/43, 54; 446/484
See application file for complete search history.

(56) References Cited

U.S. PATENT DOCUMENTS

| 2,390,706 | A | * | 12/1945 | Hearon | G09B 23/185 |
| | | | | | 29/825 |
| 2,940,016 | A | * | 6/1960 | Flint | H05K 7/04 |
| | | | | | 174/166 S |
| 4,321,588 | A | * | 3/1982 | Gabor | H05K 7/02 |
| | | | | | 340/815.47 |
| 4,606,725 | A | * | 8/1986 | Chio | G09B 23/186 |
| | | | | | 434/224 |
| 4,650,425 | A | * | 3/1987 | McGarry | G09B 25/02 |
| | | | | | 248/639 |
| 5,309,327 | A | * | 5/1994 | Slater | H05K 1/0287 |
| | | | | | 174/250 |
| 6,650,548 | B1 | * | 11/2003 | Swetland | G09B 23/18 |
| | | | | | 361/777 |
| 6,685,483 | B2 | * | 2/2004 | Blauvelt | H01R 9/22 |
| | | | | | 439/43 |
| 8,991,040 | B2 | * | 3/2015 | Chen | H01R 9/28 |
| | | | | | 29/592.1 |
| 9,112,289 | B1 | * | 8/2015 | Lin | H01R 9/28 |
| 2004/0096812 | A1 | * | 5/2004 | Goh | G09B 23/185 |
| | | | | | 434/379 |
| 2009/0298023 | A1 | * | 12/2009 | Kim | G09B 23/183 |
| | | | | | 434/224 |
| 2016/0109479 | A1 | * | 4/2016 | Alhalabi | G01R 1/0416 |
| | | | | | 324/756.07 |

* cited by examiner

*Primary Examiner* — Kurt Fernstrom
(74) *Attorney, Agent, or Firm* — R. William Graham

(57) ABSTRACT

A breadboard includes a panel having a top side and a bottom side, a first and second plurality of spaced component receiving openings extend through the top side surface and communicate with a larger first and second terminal receiving open surfaces extending from the bottom side surface which are configured to receive a first and second conductive terminals, respectively, and on a side of at least one of the first and second plurality of spaced openings in the top side surface is formed a raised surface and spanning a length approximate the larger terminal receiving open surfaces and parallel thereto and which forms part of the top side surface thereby defining a row of said plurality of spaced component receiving openings in which the conductive terminals lie.

2 Claims, 5 Drawing Sheets

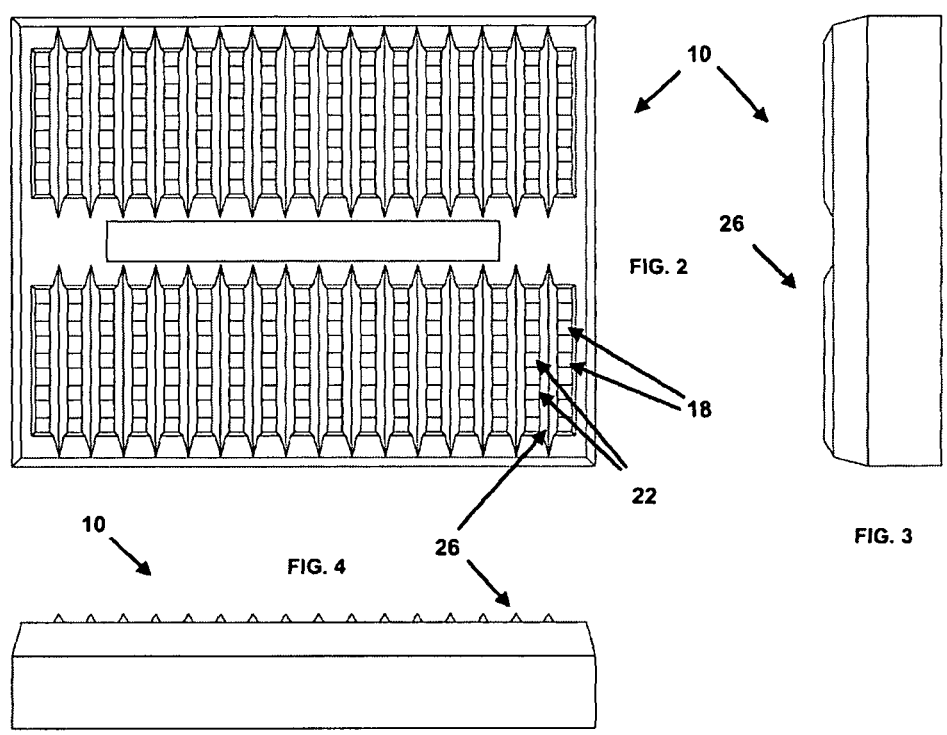

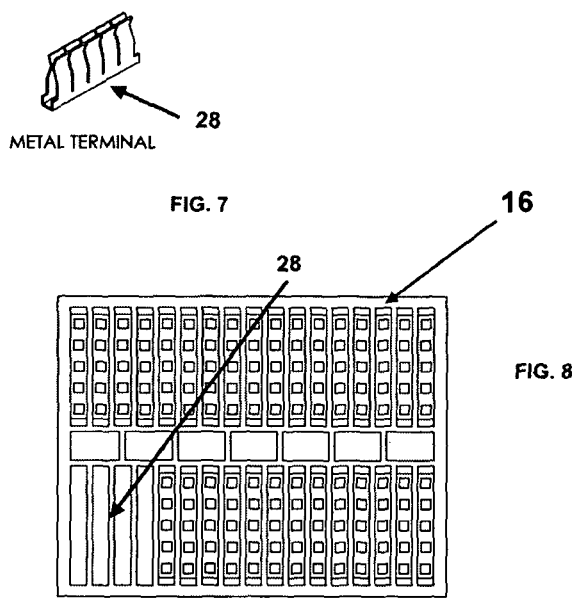

BREADBOARD

FIELD OF INVENTION

The instant invention relates to electrical teaching aids. More particularly, the invention is directed to a breadboard aid teaching aid.

BACKGROUND

Breadboards (also known as Universal board or IC test board) have long existed in many forms and typically include holes on the board and a plurality of electrical jumper connectors. Such breadboards are designed for solderless experimental design in electronic circuits.

A variety of electronic components can be freely inserted or removed as needed to form a desired circuit, eliminating the need for welding or soldering. Breadboards save experimental assembly time by allowing the circuit and components to be reused. Hence, it is very suitable for electronic circuit assembly, commissioning and training.

While breadboards provide a tool for existing operations and provide a great degree of freedom for experimentation, they can be difficult for the learner to properly use and successfully build circuits according to a given circuit diagram. This is due to the less than obvious understanding where connectors must be placed in order to obtain proper connections in the circuit.

SUMMARY OF INVENTION

It is an object to provide an improved breadboard.

A further object is to provide a convenient breadboard for use in teaching.

Thus, the invention is directed to a breadboard which includes a panel having a top side surface and a bottom side surface, wherein a first plurality of spaced component receiving openings extend through the top side and communicate with a larger first terminal receiving open surface extending from the bottom side surface and which is configured to receive a first conductive terminal. Adjacent thereto is a second plurality of spaced component receiving openings extend through the top side surface and communicate with a larger second terminal receiving open surface extending from the bottom side and which is configured to receive a second conductive terminal. Preferably on either side of the first and second plurality of spaced openings in the the top side surface is formed a raised surface and spanning a length approximate the larger terminal receiving open surfaces and parallel thereto and which forms part of the top side surface thereby defining a row of said plurality of spaced component receiving openings in which said conductive terminals lie. Additionally, the raised surface is configured with a height to allow standard electrical components such as integrated circuits to be inserted into the breadboard. In this way, the slanted surface defines a row of the spaced component receiving openings whereby a user can easily connect an electrical end of a first electrical component and first end of a second electrical component in order to make an electrical connection. The slanted surface is preferably pitched to aid in directing the end of the components into one of the spaced openings to connect to a terminal seated in the larger open surface in the bottom side surface.

BRIEF DESCRIPTION OF THE DRAWINGS

The following conjunction with the drawings of the utility model as described in further detail:

FIG. 2 is a top view of the invention;
FIG. 3 is an end view of the invention;
FIG. 4 is a side view of the invention;
FIG. 7 is a conductive terminal part of the invention;
and
FIG. 8 is a bottom view illustrating several conductive terminals connected to bottom side surface of the breadboard.

DETAILED DESCRIPTION OF PREFERRED EMBODIMENT

Figure 1:
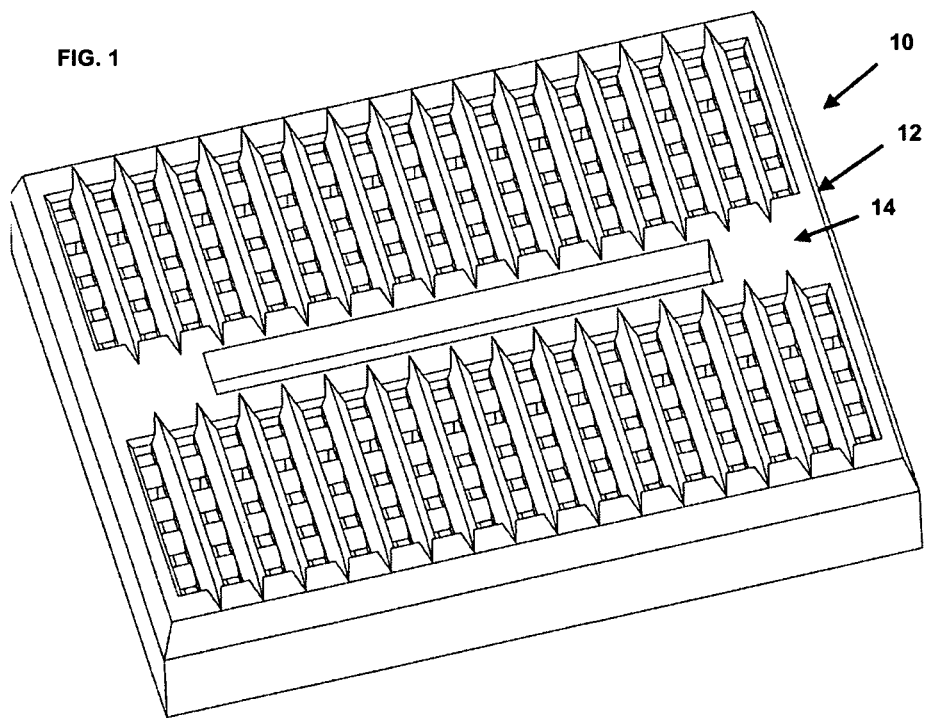
FIG. 1 is a top perspective diagram of the structure of the invention.
Figure 6:
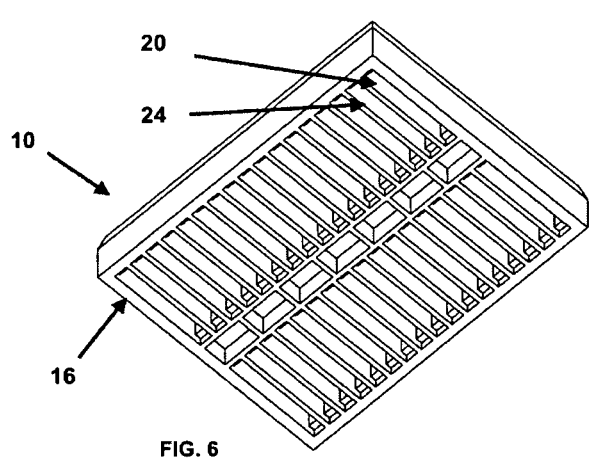
FIG. 6 is a bottom perspective diagram of the structure of the invention.
Figure 5:
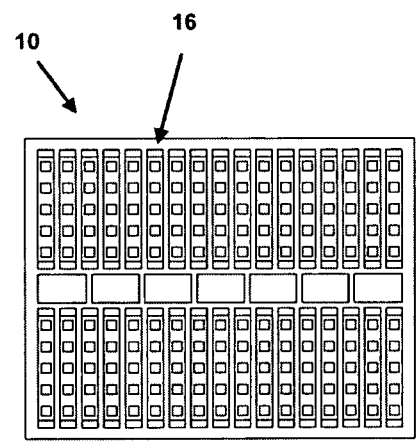
FIG. 5 is a bottom view of the invention.
Figure 9:
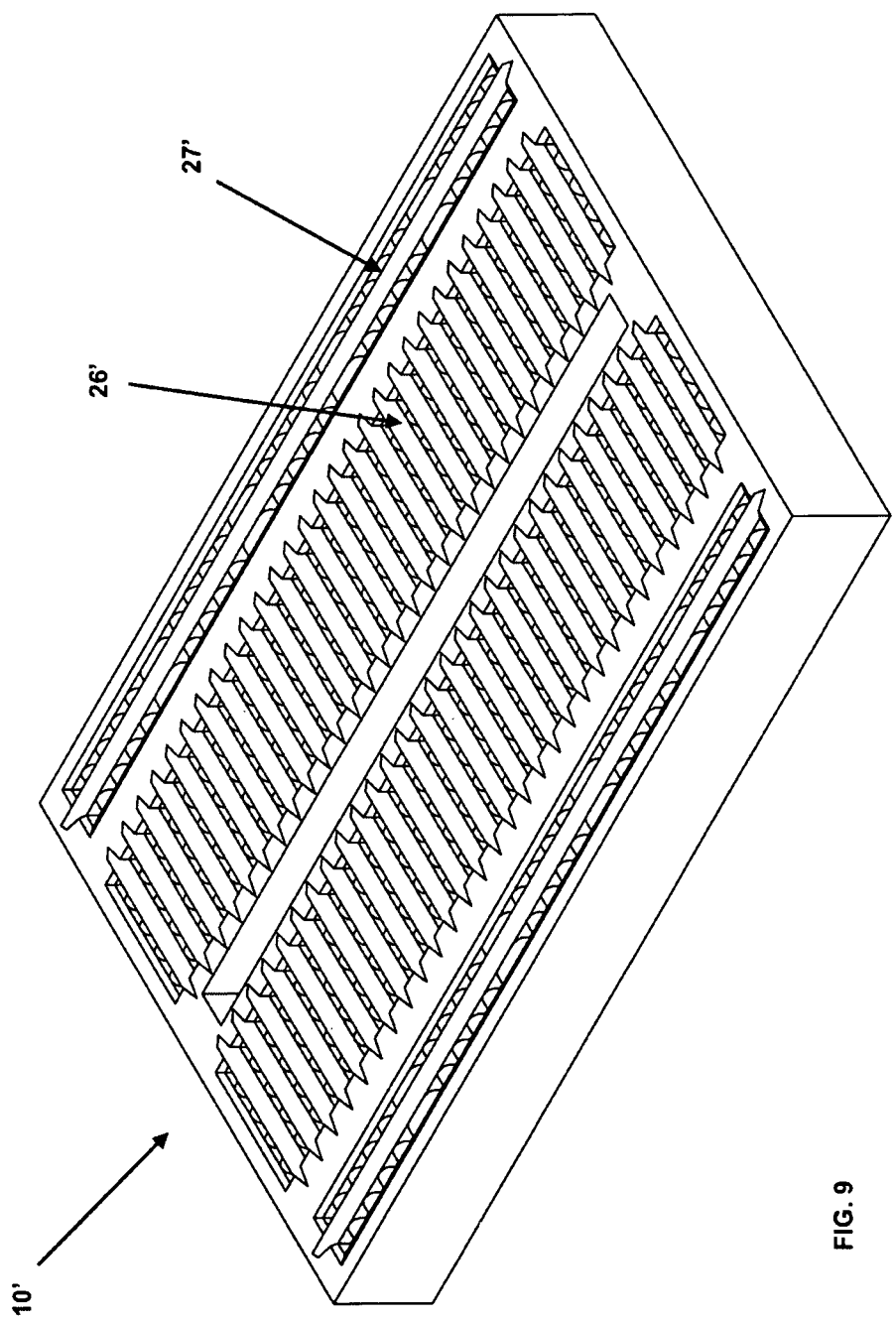
FIG. 9 is another embodiment of the invention.

Referring now to the drawings, the instant invention is directed to a breadboard generally referenced by the numeral 10. Breadboard 10' is another embodiment of the invention which simply shows another configuration. Like numerals refer to like formed parts. The breadboard 10 includes a panel 12 having a top side surface 14 and a bottom side 16. A first plurality of spaced component receiving openings 18 extend through the top side surface 14 and communicate with a first larger terminal receiving open surface 20 extending from the bottom side surface 16. The larger first terminal receiving open surface 20 is configured to receive a first conductive terminal 28.

Adjacent to the first plurality of spaced component receiving openings 18 is a second plurality of spaced component receiving openings 22 which extend through the top side surface 14 and communicate with a larger second terminal receiving open surface 24 extending from the bottom side surface 16 and which is likewise configured to receive a second conductive terminal 28. Preferably on either side of the first and second plurality of spaced openings in the top surface is formed a raised surface 26, here seen as a slanted peak, and spanning a length approximate the larger open surfaces 20, 24 and parallel thereto and which forms part of the top surface 14. Breadboard 10' includes raised surfaces 26' and 27' which include similar functionality to further the purpose of invention set forth herein.

In this way, the raised surface 26 defines a row of the spaced component receiving openings 18, 22, etc. in which said conductive terminals 28 lie whereby a user can easily identify and connect an electrical end of a first electrical component and first end of a second electrical component in order to make an electrical connection. Additionally, the raised surface 26 is configured with a height to allow standard electrical components such as integrated circuits to be operably inserted into the breadboard 10, which height can be less than about 0.03 inches. The raised surface 26 is preferably pitched to aid in directing the end of the components into one of the spaced component receiving openings 18, 22 to connect to a terminal 28 seated in the larger open surface 20, 24, etc. in the bottom side surface 16.

The invention is described above with respect to an embodiment. It will be appreciated that other modifications, variations and derivations will be apparent to those skilled in the art. For example, the raised surface can be rounded or chamfered. The number and sizes of openings can vary and these can include various slanted raised surfaces as described herein. Accordingly, such modifications, variations and derivations should be afforded in the claims appended hereto.

What is claimed is:

1. A breadboard, which includes: a panel having a top side surface and a bottom side surface, wherein a first plurality of spaced component receiving openings extend through said top side surface and communicate with a larger first terminal receiving open surface extending from said bottom side surface which is configured to receive a first conductive terminal; a second plurality of spaced component receiving openings are adjacent said first plurality of spaced component receiving openings and extend through said top side surface and communicate with a larger second terminal receiving open surface extending from said bottom side surface which is configured to receive a second conductive terminal; and on a side of at least one of said first and second plurality of spaced openings in said top side surface is formed a raised surface and spanning a length approximate said larger terminal receiving open surfaces and parallel thereto and which forms part of said top side surface r and is configured with a height to allow standard electrical components to be operably inserted into said breadboard, said raised surface thereby defining a row of said plurality of spaced component receiving openings in which said conductive terminals lie.

2. The breadboard of claim 1, wherein said raised surface has a slant.

* * * * *